United States Patent
Shimmell

[11] Patent Number: 5,733,049
[45] Date of Patent: Mar. 31, 1998

[54] MATED MOLDED PARTS ASSEMBLY AND METHOD FOR MAKING SAME

[75] Inventor: Dennis S. Shimmell, Hudsonville, Mich.

[73] Assignee: Nelson Metal Products Corporation, Grandville, Mich.

[21] Appl. No.: 724,609

[22] Filed: Sep. 30, 1996

Related U.S. Application Data

[62] Division of Ser. No. 324,797, Oct. 18, 1994, Pat. No. 5,586,380, which is a division of Ser. No. 994,272, Dec. 21, 1992, Pat. No. 5,387,472, which is a continuation-in-part of Ser. No. 886,694, May 20, 1992, Pat. No. 5,313,703.

[51] Int. Cl.$^6$ .................................................. F16C 17/02
[52] U.S. Cl. ................................................ 384/434; 384/503
[58] Field of Search .................................. 384/294, 503, 384/432, 434, 433

[56] References Cited

U.S. PATENT DOCUMENTS

| | | | |
|---|---|---|---|
| 309,439 | 12/1884 | Chillingworth et al. | 428/609 |
| 842,477 | 1/1907 | Lodor | 428/609 |
| 1,682,590 | 8/1928 | Austin. | |
| 1,834,746 | 12/1931 | Short | 428/613 |
| 1,939,467 | 12/1933 | Short et al. | 113/112 |
| 2,044,897 | 6/1936 | Boegehold et al. | 29/149.5 |
| 2,060,034 | 11/1936 | Chandler | 29/149.5 |
| 2,086,841 | 7/1937 | Bagley et al. | 204/8 |
| 2,285,583 | 6/1942 | Jennings et al. | 428/609 |
| 2,319,607 | 5/1943 | Kerorkian et al. | 264/274 |
| 2,331,584 | 10/1943 | Underwood | 29/149.5 |
| 2,371,399 | 3/1945 | Mantle | 29/149.5 |
| 2,465,329 | 3/1949 | Murray | 29/196.3 |
| 2,490,548 | 12/1949 | Schultz | 428/609 |
| 2,690,004 | 9/1954 | Crawford. | |
| 3,081,644 | 3/1963 | Hudgens et al. | |
| 3,088,783 | 5/1963 | Conover. | |
| 3,096,578 | 7/1963 | Sample. | |
| 3,249,391 | 5/1966 | Dehart | 384/294 |
| 3,799,236 | 3/1974 | Pierce. | |
| 3,818,577 | 6/1974 | Bailey et al. | |
| 3,995,357 | 12/1976 | Boggs et al. | 29/149.5 R |
| 4,154,900 | 5/1979 | Kaku et al. | 428/609 |
| 4,351,530 | 9/1982 | Bertozzi | 264/274 |
| 4,417,615 | 11/1983 | Stockman. | |
| 4,576,875 | 3/1986 | Olsson et al. | 164/111 |
| 5,199,170 | 4/1993 | Mori et al. | 27/898 |
| 5,215,047 | 6/1993 | Neutgens | 384/503 |
| 5,244,746 | 9/1993 | Matsui et al. | 428/609 |

FOREIGN PATENT DOCUMENTS

| | | |
|---|---|---|
| 0167320 | 1/1986 | European Pat. Off. |
| 3423306 | 1/1986 | Germany. |
| 0005071 | 1/1977 | Japan. |
| 63-57134 | of 1988 | Japan. |

*Primary Examiner*—Lenard A. Footland
*Attorney, Agent, or Firm*—Warner Norcross & Judd LLP

[57] ABSTRACT

A assembly of mated molded parts and a method for making same are disclosed in which the assembly has first and second parts with precisely mating surfaces. The first part is formed by molding, casting, or the like such that the mating surface of the first part is formed with at least one protrusion. The second part is formed in place against the first part such precisely mating surfaces are formed with the second part enveloping the protrusion. The two parts thus formed are forced apart from each other. The protrusion may be formed with a head which interlocks with the second part. When the parts are separated, the head breaks from the protrusion. In a particular embodiment, a bearing cap is disclosed having a central opening for the passage of a shaft.

15 Claims, 4 Drawing Sheets

MATED MOLDED PARTS ASSEMBLY AND METHOD FOR MAKING SAME

CROSS REFERENCE TO RELATED APPLICATION

This is a divisional of application Ser. No. 08/324,797, filed Oct. 18, 1994 (now U.S. Pat. No. 5,586,380) which is a divisional of application Ser. No. 07/994,272, filed Dec. 21, 1992 (now U.S. Pat. No. 5,387,472), which is a continuation-in-part of application Ser. No. 07/886,694, fried May 20, 1992 (now U.S. Pat. No. 5,313,703).

BACKGROUND OF THE INVENTION

1. Field of the Invention

The present invention relates to an assembly of mated parts and, more particularly, to an assembly of precisely interfitting and mating parts and to a method for making such an assembly.

2. Description of the Related Art

It is frequently desired to provide an assembly of parts in which there is a precise mating or interfitting between the parts. As an example, bearing caps are frequently formed as split rings having two parts surrounding the shaft or bearing and joined together along a diemetric line. With such split rings, not only must the central bore fit closely to the shaft or bearing, but the parts of the caps must fit precisely together at the mating surfaces of the parts of the caps. If the parts of the caps are manufactured separately and individually for subsequent machining and assembly, it is difficult to maintain the tolerances necessary to provide a sufficiently precise fit.

The term "bearing cap" as used herein denotes a device used to surround, support, and guide a rotating or reciprocating shaft. A typical use is at a point of penetration of the shaft through a housing or enclosure such as at the passage of a camshaft or crankshaft through an engine block. Another typical use is at the passage of a crankshaft through a piston connecting rod. The bearing cap may make direct contact with the shaft, or, as is more frequently the case, the bearing cap may surround a bearing which, in turn, directly contacts the shaft. In either event, the bearing caps must be manufactured to close tolerances in order to provide a close, uniform fit around the shaft or bearing.

It has been proposed in the prior art to manufacture a two part bearing cap from a unitary bar stock or a cast unitary metal ring. The two parts of the bearing cap are made by first defining a diametric fracture plane by forming weakened diametric notches or grooves on the outer surfaces of the ring on either side of the central opening of the ring. Force is applied to the portions of the ring at opposite sides of the notches or grooves sufficient to fracture the ring along the fracture plane and form two separate ring halves. The intended result of this method is that the fractured diametric surfaces of the ring halves will mate precisely when the ring halves are placed around a shaft or bearing and brought back together.

In practice, however, the aforementioned prior art method has significant drawbacks. First, when the ring is fractured, the metal at the fracture surface is frequently splintered or distorted. Because of this distortion, the fracture surfaces do not precisely mate together when the ring halves are brought together. Second, since the ring must be fractured across its entire diametric cross-sectional area, the force required to produce the fracture is huge. Such force is concentrated at the points where the fracturing device contacts the ring, thus causing the ring to bend and lose its desired dimensions. Third, an embedded steel reinforcing insert may not be used since the internal boundaries between the steel insert and the surrounding cast metal will define stress lines. The ring will tend to fracture along these stress lines rather than along the intended diametric plane.

In another prior art method of manufacturing a two part bearing cap, two semicylindrical halves are first formed separately. The mating diametric surfaces of each half are machined and bores are drilled into the surfaces. Dowels are inserted into the bores and the two halves are assembled together aligned by the dowels. Next, the central opening of the assembled bearing cap is machined to the desired diameter and finish. The halves are then disassembled.

This second prior art method also presents significant drawbacks. The method is quite costly, requiring dowels, a step of machining the four mating surfaces, and a step of drilling the four bores for the dowels. Several close tolerances must be held, including the positioning and diameter of the dowel bores and the flatness and orientation of the mating surfaces. A step of assembling bearing cap parts is required before the central opening can be machined, and it may be necessary to bolt the bearing cap parts together before the machining can be done.

The problems noted above are not limited to bearing caps or to assemblies having central openings. Such problems may arise whenever separable and assembleable parts are required to mate precisely.

Accordingly, there is a heretofore unmet need for an assembly of precisely interfitting parts an economical method for making such parts.

SUMMARY OF THE INVENTION

The present invention satisfies the aforementioned need by providing an assembly of molded parts in which a first part is molded separately and a second part is subsequently molded to interfit and interlock with the first part. When moldable material, such as molten metal, is molded against the surface of a previously molded part, the material does not adhere to the previously molded part. The two parts are then separated by pulling them apart. If the parts are made with an interlock, separation is accomplished by fracturing at the interlock or interface between the parts. Since the second part is molded in place with respect to the first part, the mating surfaces of the two parts interfit precisely and exactly together.

In a bearing cap made according to a preferred embodiment of the invention, the mating surfaces of the first bearing cap part is formed with frustoconical protrusions having enlarged distal ends. When the second part is cast, the second part envelops these protrusions, thus capturing the enlarged ends of the protrusions. The two parts are thus held firmly together during any machining operations which may be required. When force is applied to separate the two parts, the protrusions fracture at the neck by which the enlarged ends are connected to the protrusions. These necks thus provide fracture zones having a greatly reduced cross-sectional area as compared to the area of the mating surfaces of the parts. Thus, a only a relatively small force is needed to fracture the necks of the protrusions and separate the parts. The small force required will not bend the parts.

When the parts of the bearing cap according to a preferred embodiment of the invention are first separated, recesses are formed in the second part which mate precisely with the protrusions on the first part. Thus, the protrusions and recesses provide a dowel-like means for precisely aligning the two parts with respect to each other when the parts are reassembled.

According to an alternate embodiment of the invention, the protrusions of the first part are not formed with enlarged ends or heads. This approach is suitable for assemblies which do not need to be held firmly together prior to final assembly or for materials which shrink when hardening.

In a preferred embodiment of the method of the invention, the parts of the assembly are formed in a die or mold having two cavities. The first cavity is for forming the first part only. The second cavity is for receiving a previously cast first part and for forming a second part in interlocking or interfitting relationship with a previously formed first part. Thus, each cycle of the die can produce a separate first part and a fully formed assembly. If machining of the assembly is required, the machining may be performed prior to separating the two parts.

These and other objects, advantages, and features of the present invention will be more fully understood and appreciated by reference to the written specification and appended drawings.

DESCRIPTION OF THE PREFERRED EMBODIMENT

Figure 1:
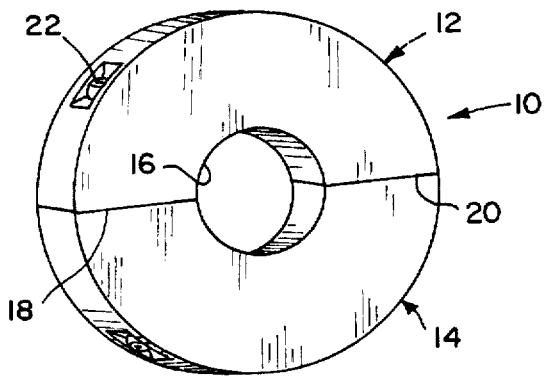
FIG. 1 is a perspective, somewhat diagrammatic, view of a bearing cap according to the principles of the invention.

By way of disclosing a preferred embodiment, and not by way of limitation, there is shown in FIG. 1 an assembly of mated molded parts comprising a bearing cap 10 which includes in its general organization a first part 12, or upper half, and a second part 14, or lower half. Together, the parts form a circular disk having a central circular opening 16 for the passage of a shaft, the retention of a bearing, or the like. Other, noncircular shapes are possible within the scope of the invention. For example, if the bearing cap is used at the end of a piston connecting rod, first part 12 may have an integral connecting rod portion extending therefrom. At either side of the central opening, the first and second parts 12, 14 are mated together along diametrically disposed planes 18, 20. The parts are held together in assembled relationship by bolts 22, screws, or other suitable fasteners which extend through holes as more fully described below. The parts are preferably formed of cast aluminum. A suitable material is 380 aluminum.

Figure 2:
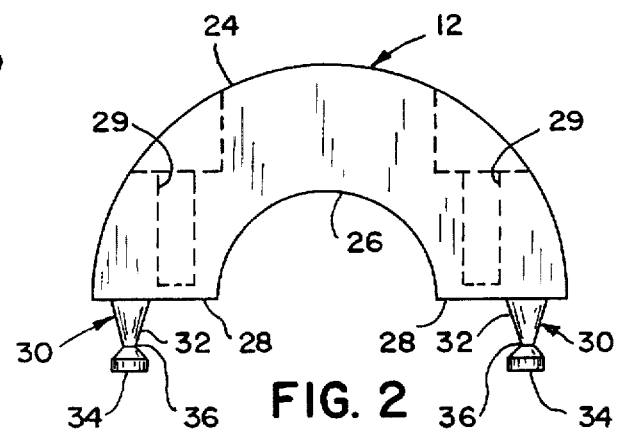
FIG. 2 is a front elevational view of the separately formed upper half of the bearing cap of FIG. 1.
Figure 3:
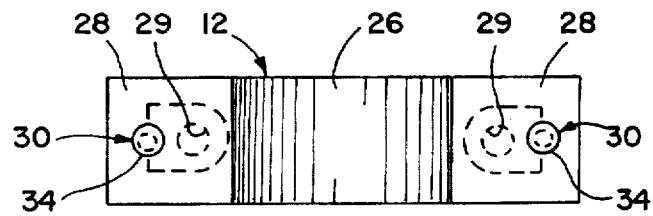
FIG. 3 is a bottom view of the bearing cap upper half of FIG. 2.

Details of the first part 12, or upper half, are shown in FIGS. 2 and 3. The first part 12 is in the form of a semicylinder, or half ring, having an outer surface 24, an inner surface 26, and a pair of planar mating surfaces 28 disposed at either side of the central opening through which the shaft will pass. The first part is formed with a pair of countersunk bores 29 through which fasteners will pass when the bearing cap is assembled.

An integral protrusion 30 extends from each of the mating surfaces 28 disposed axially perpendicularly to the mating surfaces. Each protrusion includes an outwardly narrowing frustoconical portion 32, an enlarged head 34, and a neck portion 36 joining the frustoconical portion to the head. The neck portions 36 form areas of reduced cross-sectional area across which the protrusions may be fractured to separate the heads 34 from the frustoconical portions 32.

Figure 4:
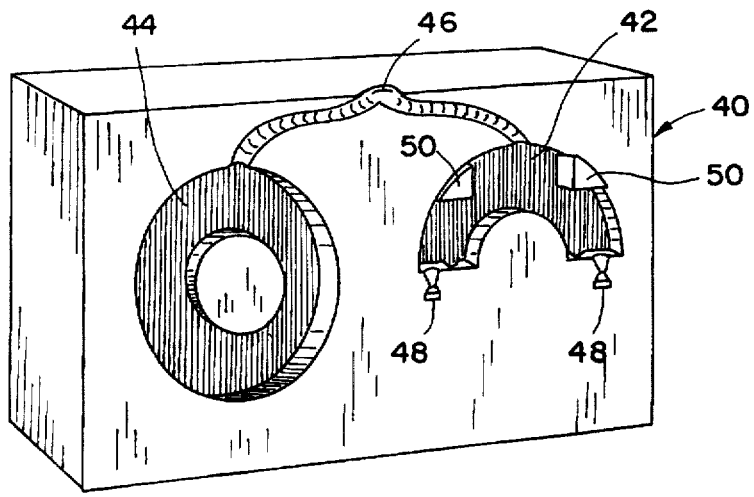
FIGS. 4–7 are perspective, diagrammatic, views of a die half used according to the method of the invention to manufacture the bearing cap of FIG. 1, illustrating steps in the method.

An apparatus and method for manufacturing the bearing cap of the invention are shown in FIGS. 4–9. In FIG. 4, it may be seen that the die half 40 is formed with two cavities 42, 44 and a bifurcated passageway 46 for introducing molten metal into the cavities. As is well known in the art, an identical, mating die half is used with the die half shown in the Figures.

Cavity 42 is used to separately cast the first parts 12 of the bearing cap. As such, cavity is generally semicylindrical with two smaller recess 48 corresponding to the protrusions 30 shown in FIG. 2. Cavity 44 is cylindrical, and conforms to the overall shape of the fully assembled bearing cap as shown in FIG. 1.

As shown in FIG. 4, cores 50 are positioned in the cavity 42 prior to casting the first parts 12. As is well known in the art, these cores will prevent metal from filling the countersunk bores 29 (FIG. 2). The cores are removed after the bearing cap is fully cast.

Figure 5:
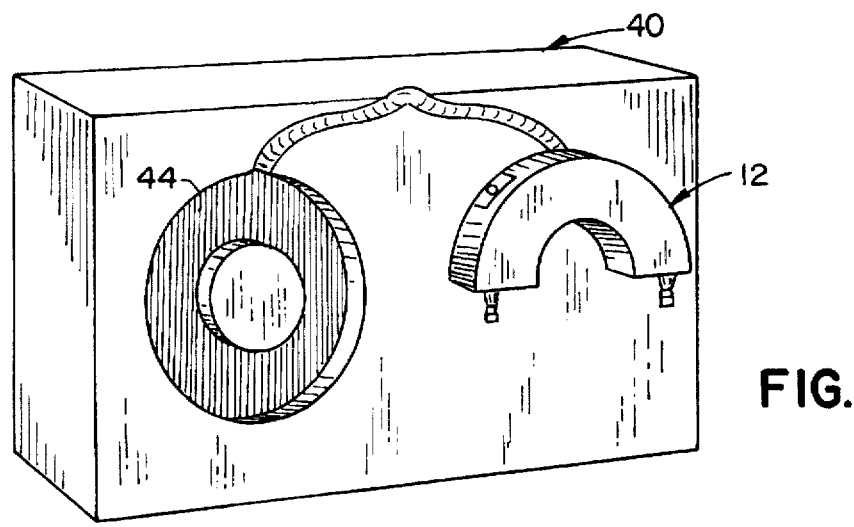
Figure 6:
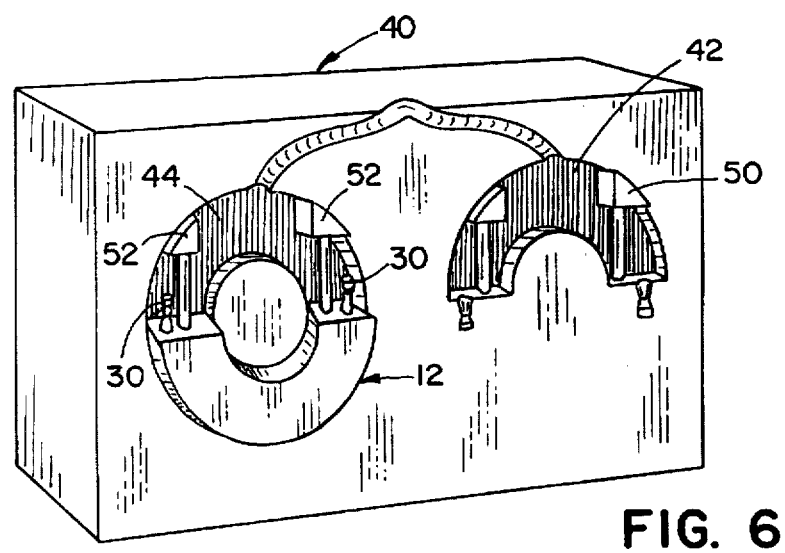

Two die halves are brought together, and molten metal is introduced into the cavity 42. As shown in FIG. 5, a first part 12 is thus formed. Next, as shown in FIG. 6, the newly formed first part 12 is removed from the cavity 42. The first part 12 is inverted and placed in the lower portion of cavity 44. New cores 50 are placed in the cavity 42. Similarly, cores 52 are placed in the upper portion of the cavity 44 in alignment with the countersunk bores formed in the first part 12. The protrusions 30 of the first part 12 extend upwardly into the unoccupied upper portion of the cavity 44.

Figure 7:
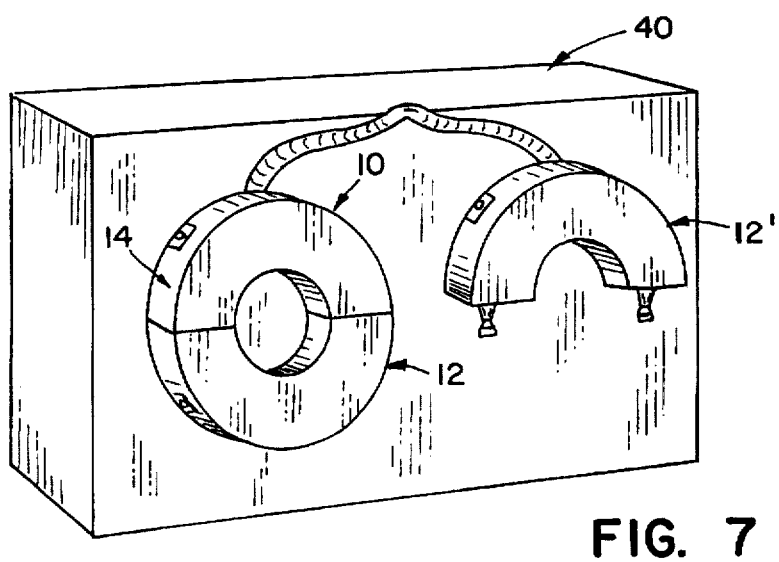

Next, the two die halves are again brought together, and molten metal is introduced into both cavities 42 and 44. As shown in FIG. 7, this results in the formation of a second bearing cap first part 12' in the cavity 42, and the formation of a bearing cap second part 14 in the upper portion of the cavity 44. The second part 14 is thus perfectly mated to the first part 12. The newly cast metal of the second part 14 does not adhere to the previously cast metal of the first part 12 which allows the two parts to be subsequently separated.

The bearing cap 10 thus formed is then removed from the die 40. The cores 50, 52 are removed. Bearing cap 12' is transferred to the cavity 44. The steps illustrated in FIGS. 6 and 7 are repeated, with each cycle producing a fully formed bearing cap 10 and a separate first part 12.

Figure 8:
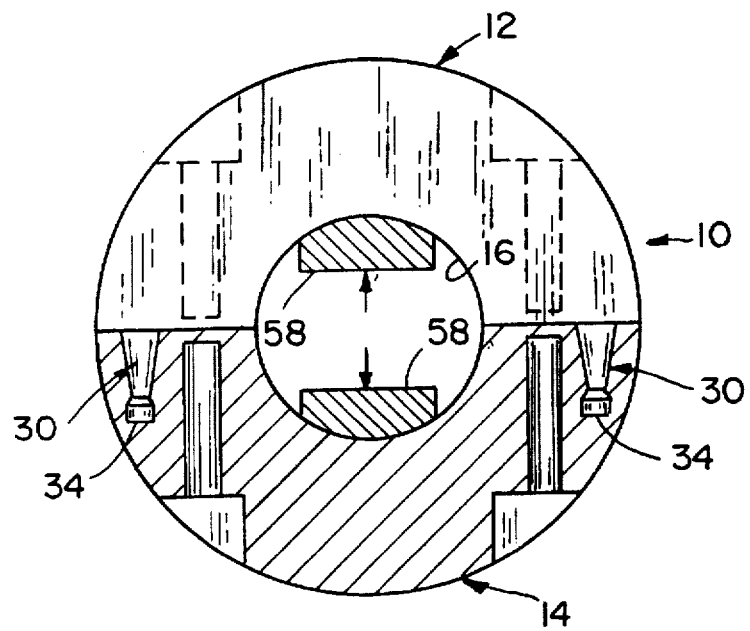
FIG. 8 is a front elevational view of the bearing cap with the second part in vertical section prior to fracturing the protrusions of the first part.

As shown in FIG. 8, the metal of the second part 14 of a newly formed bearing cap 10 completely envelops the protrusions 30 of the first part 1. The heads 34 of the protrusions are captured by, and interlocked with, the second part. At this point, the central opening 16 of the bearing cap may be machined to the desired diameter and surface finish. If necessary, the countersunk bores such as bore 29 may be drilled to the correct diameter or tapped. The parts are rigidly held together during such machining by the protrusions and heads interlocked with the second part.

Figure 9:
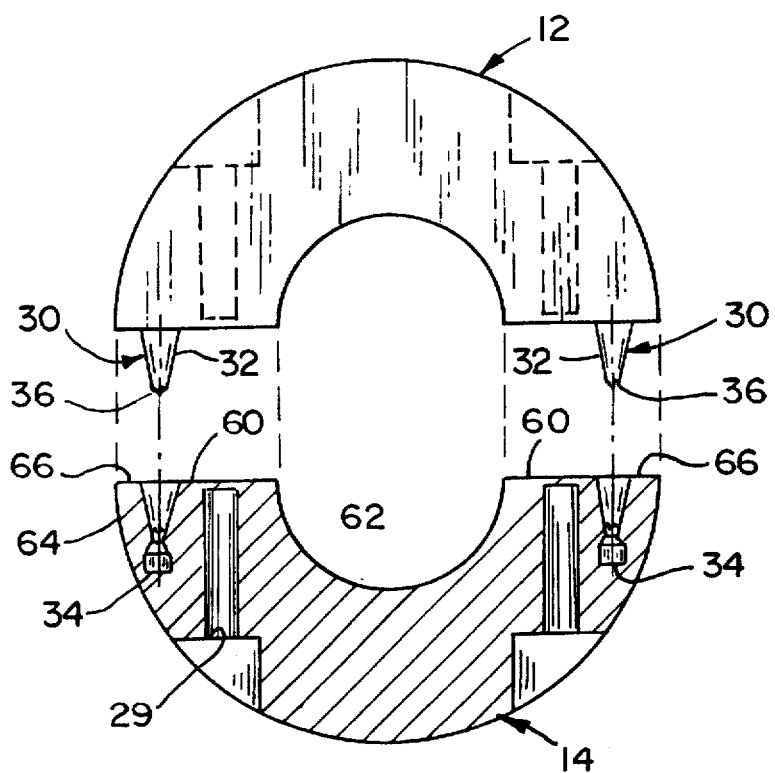
FIG. 9 is an exploded front elevational view of the bearing cap with the second part in vertical section subsequent to fracturing the protrusions of the first part.

To separate the two parts, a device having fingers 58 is inserted into the central opening 16 of the bearing cap. The fingers are then forcefully spread apart. As shown in FIG. 9, the spreading apart of the fingers 58 causes the protrusions 30 to fracture and break at their neck portions 36 thus separating the bearing cap parts 12, 14. Only a relatively small force is required to fracture the necks because of their small cross-sectional area. The heads 34 remain embedded in the second part 14.

The second part 14 thus formed is provided with planar mating surfaces 60, inner surface 62, and outer surface 64 which mate perfectly with the corresponding surfaces of the first part 12. A frustoconical recess 66 is formed through each of the mating surfaces 60. Each recess 66 mates perfectly with the frustoconical portions 32 of the protrusions 30 of the first part 12. Thus, when the bearing cap is reassembled around a shaft or bearing, the frustoconical portions 32 and the recesses 66 guide the two parts together into perfect coalignment.

The invention is not limited to casting or the use of metal. Other forming techniques and other materials may be used. For example, assemblies according to the invention may be made using molded powdered metal or molded plastic. It is sufficient that the materials used be moldable to the extent that the material is initially flowable, formed into the desired shape, then hardened. The terms "molded" and "moldable" as used herein are intended to encompass all such forming techniques and materials.

Figure 10:
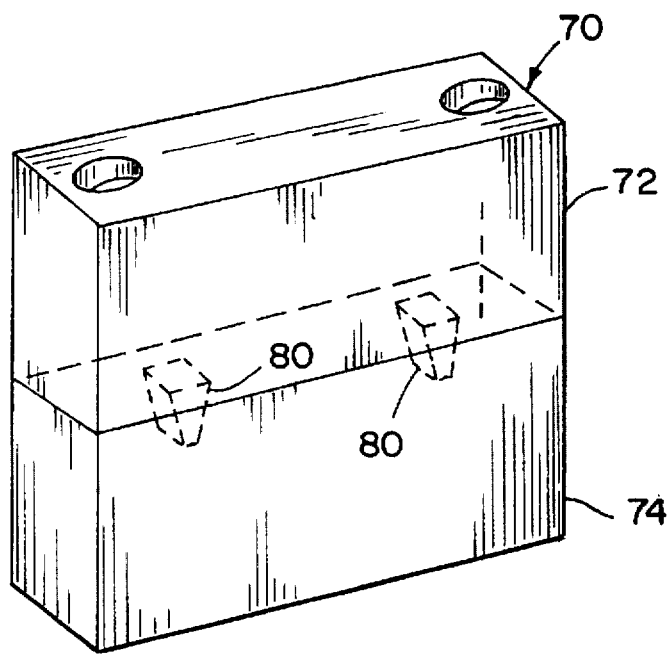
FIG. 10 is a perspective, somewhat diagrammatic, view of an assembly of mated, molded parts according to the invention.
Figure 11:
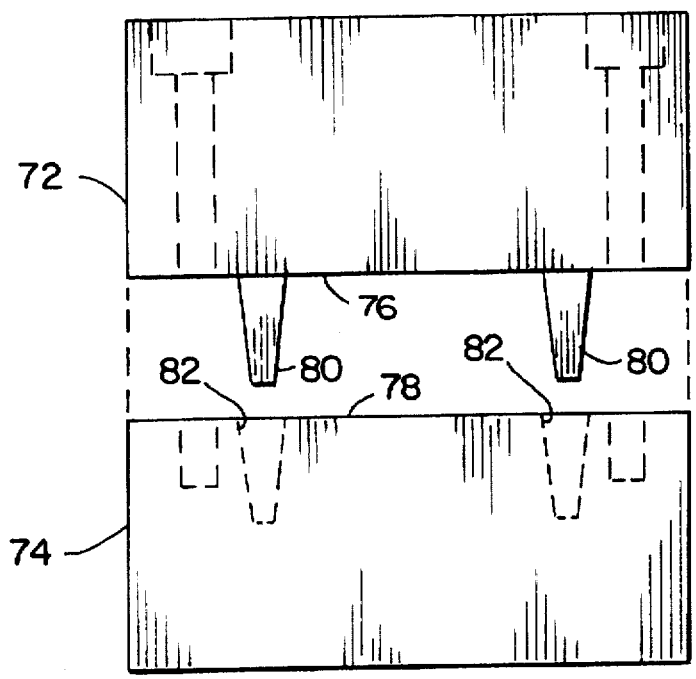
FIG. 11 is an exploded front elevational view of the assembly of FIG. 10.

The invention is not limited to bearing caps and the manufacture of bearing caps. FIGS. 10 and 11 diagrammatically show an assembly 70 a first part 72 and a second part 74 which precisely fit together along confronting surfaces 76, 78. First part 72 is molded in the manner described above. First part 72 is molded with wedge-like protrusions 80. Second part 74 is molded against the first part 72 such that the protrusions 80 form the recesses 82 in the second part.

In contrast to the protrusions 30 described above, protrusions 80 are wedge shaped rather than frustoconical. Furthermore, protrusions 80 are not formed with enlarged heads. The enlarged heads may be omitted if it is not necessary to hold the parts together firmly prior to separation and reassembly. Also, the material of the second part 74 may shrink as it hardens such that the protrusions 80 are grasped within the recesses 82. The parts may be separated by pulling them apart such that the protrusions 80 are withdrawn from the recesses 82.

The assembly of parts according to the invention may be formed with only a single protrusion and recess, or with more than two. The mating surfaces of the parts, such as surfaces 76 and 78 in FIG. 11, need not be flat or planar. The assemblies shown in the figures are but illustrative of an unlimited variety of types, shapes, and configurations of assemblies which may be made according to the principles of the invention.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A cast bearing cap having a central opening for the passage of a shaft comprising:

a first part having first and second mating surfaces disposed on either side of said central opening, each of said mating surfaces having a protrusion extending therefrom and initially terminating in an enlarged head;

a second part having first and second mating surfaces disposed on either side of said central opening, each of said first and second mating surfaces of said second part mating with said first and second mating surfaces, respectively, of said first part;

each of said first and second mating surfaces of said second part having a recess, each of said recesses enveloping one of said protrusions and capturing one of said enlarged heads, said enlarged heads being fractured from said protrusions, whereby said first part may be separated from said second part with said heads remaining within said recesses.

2. The cast bearing cap of claim 1 wherein each said enlarged head is initially joined to a said protrusion by a neck portion providing a fracture zone of reduced cross-sectional area with respect to the area of the mating surface from which the protrusion extends.

3. The cast bearing cap of claim 2 wherein said protrusions are frustoconical and narrowing outwardly from the mating surfaces from which they extend.

4. The cast bearing cap of claim 3 further comprising bores formed in said first and second parts for the insertion of fasteners for holding said first and second parts in assembled relationship.

5. A cast bearing cap having a central opening for the passage of a shaft, said bearing cap comprising:

first and second parts each having mating surfaces mated together at opposite sides of said central opening;

each mating surface of said first part integrally formed with a protrusion extending outwardly from said mating surface and terminating in an enlarged head joined to said protrusion by a neck portion having a cross-sectional area reduced with respect to the area of said mating surface;

said second part being cast in place with respect to said first part, whereby each mating surface of said second part interfits precisely with the corresponding mating surface of said first part, and whereby each said protrusion is enveloped by said second part with said enlarged head interlocked within said second part.

6. The cast bearing cap of claim 5 wherein said enlarged heads are separated from said protrusions by fractures across said neck portions.

7. The cast bearing cap of claim 6 wherein said protrusions are frustoconical and narrowing outwardly from said mating surfaces of said first part.

8. The cast bearing cap of claim 6 wherein said cast bearing cap is formed of aluminum.

9. The cast bearing cap of claim 6 wherein each of said first and second parts is semicylindrical.

10. The cast bearing cap of claim 6 further comprising coaligned bores formed in said first and second parts for the insertion of fasteners for holding said first and second parts in assembled relationship.

11. A bearing cap having first and second interfitting parts with mating surfaces disposed on opposite sides of a central opening for the passage of a shaft, said bearing cap made by a method comprising the steps of:

forming said first part such that said first part is formed with protrusions extending from the mating surfaces of said first part;

subsequent to the forming of said first part, forming said second part in place with said first part such that the material of said second part envelops said protrusions and mates precisely with the mating surfaces of said first part;

separating said second part from said first part.

12. The bearing cap of claim 11 wherein said step of forming further comprises forming said protrusions with an enlarged head joined to said protrusions by a narrowed neck portion, and wherein said step of forming said second part comprises capturing each said enlarged head within the material of said second part.

13. The bearing cap of claim 12 wherein said step of separating comprises forcing said first and second parts apart until said narrowed neck portion of each said protrusion fractures.

14. The bearing cap of claim 11 further comprising the step of forming coaligned bores through said first and second parts for the insertion of fasteners for holding said first and second parts in assembled relationship.

15. The bearing cap of claim 11 wherein said steps of forming are performed by die casting.

* * * * *